United States Patent
Waldman et al.

[11] 3,732,071
[45] May 8, 1973

[54] TOWER FURNACE

[75] Inventors: Nathan Waldman, Midland; Julian H. Meserve, Saginaw, both of Mich.

[73] Assignee: The Dow Chemical Company, Midland, Mich.

[22] Filed: Dec. 17, 1971

[21] Appl. No.: 209,320

Related U.S. Application Data

[62] Division of Ser. No. 60,062, July 31, 1970, abandoned.

[52] U.S. Cl. .............. 432/235, 432/13, 432/86, 432/147, 215/35
[51] Int. Cl. .................. F27b 3/00, F27b 15/00
[58] Field of Search .............. 263/27, 21 B; 264/43

[56] References Cited

UNITED STATES PATENTS

| | | | |
|---|---|---|---|
| 3,627,285 | 12/1971 | Siemssen | 263/21 B |
| 3,151,965 | 10/1964 | Patterson | 263/21 B |
| 1,153,561 | 9/1915 | Moore | 263/27 |
| 3,115,335 | 12/1963 | Ornitz et al. | 263/44 X |
| 3,056,184 | 10/1962 | Blahg | 264/125 |
| 3,601,380 | 8/1971 | Siemssen | 264/43 |
| 3,418,403 | 12/1968 | Garnero | 264/43 |

Primary Examiner—John J. Camby
Attorney—W. M. Yates

[57] ABSTRACT

Disclosed herein is an improved apparatus and process for the manufacture of foamed ceramic material. The process comprises passing particles of a bloatable composition downwardly in a continuous planar curtain through an elongated heating zone, thereby to heat the particles above their melting temperature, and either cooling the particles to form expanded aggregate or alternatively collecting the particles while they are still molten to form a slab of foamed ceramic material. The improved apparatus comprises a tower furnace having an elongated serrated drum feeder positioned to discharge particles into the furnace in the form of a uniform curtain. The improved process and apparatus are especially advantageous to ceramic foam manufacture in that, as collected, the particles form a foamed ceramic slab of relatively uniform density and cell structure and of a generally rectangular cross-section.

6 Claims, 4 Drawing Figures

PATENTED MAY 8 1973 3,732,071

INVENTORS.
Nathan Waldman
Julian H. Meserve
BY Philip M. Pippenger
ATTORNEY

TOWER FURNACE

This is a division of application Ser. No. 60,062, filed July 31, 1970, now abandoned.

BACKGROUND OF THE INVENTION

In the building industry, ceramic foam insulation is used as slabs mating with each other or with other portions of a building. For this reason, it is desirable that the foamed ceramic material have a generally rectangular cross-section. Also, for economical and efficient production, it is desirable to manufacture the material in a continuous process.

Heretofore, several processes have been used to produce ceramic materials. In Slidell et al. (U. S. Pat. No. Re18,844),particles are passed down an inclined chute. The chute is moved transversely back and forth across a stationary horizontal surface residing in a heated zone to create successive layers of particles thereby forming a ceramic material. The Slidell process produces material of a generally rectangular cross-sectional area, but is not a continuous process.

In Blaha (U. S. Pat. No. 3,056,184), particles are passed downward in an annular stream through a tower furnace and are collected on a horizontal moving surface such as a conveyor belt. The Blaha process is continuous. However, the particles tend to "pile-up" along the center of the collecting surface and much of the slab must be machined away to achieve a rectangular cross-section. In this manner, more than 40 percent by volume of the slab is frequently disposed of as waste. Also, the "pile-up" decreases uniformity of the density and cell structure in the ceramic materials. The outer portions of the slab are generally less dense and possess larger cells than do portions nearer the center of the slab. Another disadvantage of prior continuous process is that particles tend to adhere to the walls of the tower furnace to form a "coral" which may eventually grow and obstruct passage through the furnace chamber.

An object of the present invention is to provide improved apparatus and process for producing a slab of foamed ceramic material possessing a generally rectangular cross-section. Another object of the invention is to provide a continuous process of passing particles in the form of a generally planar cutain downward through a tower furnace. Other objects and advantages of the invention are to reduce formation of coralloid (i.e., coral-like) materials in the furnace and also to reduce the amount of machining and waste produced in forming foamed ceramic material into slabs possessing rectangular cross-sections.

DESCRIPTION OF THE INVENTION

Figure 1:
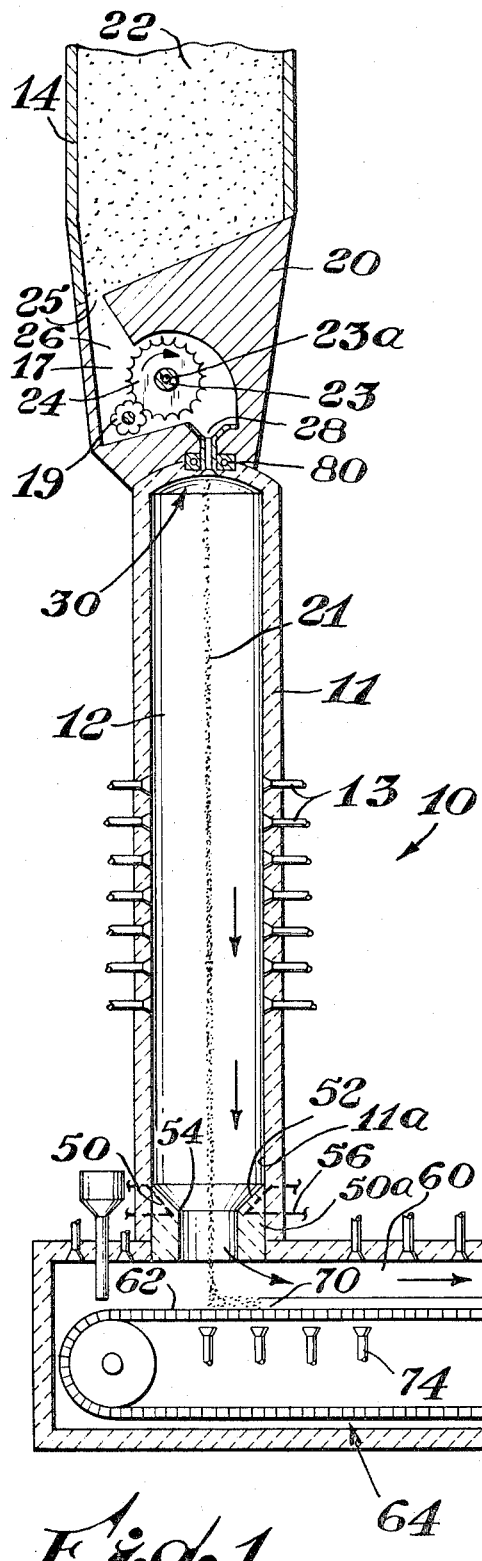
FIG. 1 is a vertical cross-sectional view of an improved tower furnace of the present invention.

The improved apparatus of the invention comprises a tower furnace defining an elongated vertical furnace chamber. Mounted above the tower furnace is a supply hopper for particulated material. Positioned between the hopper and the furnace chamber is a particle feeding device comprising a casing which defines a pre-heating chamber. An elongated, generally horizontally-disposed, serrated drum feeder is mounted rotatably within the pre-heating chamber. The casing is fitted with a particle entry port and a particle exit port. The entry port is positioned above the drum feeder and is in communication with the particle supply hopper. The particle exit port is positioned beneath the drum feeder in the path of the curtain of particles emanating therefrom. The widths of the exit and entry ports are generally coextensive with the length of the elongated drum feeder.

A guide chute is positioned immediately below the exit port and adjacent thereto. The guide chute is adapted to engage and direct the curtain of particles passing from the pre-heating chamber through the furnace chamber. To more accurately control velocity components imparted to the particles by the rotating drum, the chute is preferably fitted with a plurality of parallel spaced-apart baffles disposed at generally right angles to the planar curtain of particles passing through the chute. In combination with the chute, the baffles form a plurality of channels. Preferably, to impart suitable velocity components to the particles, the distance between the baffles (i.e., the width of the channels) is from about 10 to about 25 times the average major dimension of the individual particles. The length of the channels is from about 150 to about 250 times the average major dimension.

To provide more accurate control of the position of the curtain of particles within the furnace chamber, the guide chute is preferably pivotally mounted so that the curtain of particles passing from the chute can be passed into the furnace chamber at the position desired. For example, if the particular pattern of gas turbulence in the furnace chamber makes it advantageous to pass the curtain of particles closer to one side of the chamber than to the other to avoid disruption of the curtain by the gas turbulence, the chute can be slanted towards the desired side portion of the furnace chamber so that the curtain of particles passes therethrough.

In operation of the furnace, particles to be treated are disposed in the particle supply hopper above the furnace chamber and pass therefrom through the entry port into the pre-heating chamber. As particles pass from the supply hopper into the pre-heating chamber, it is preferred that the rate of passage of the particles be such that an accumulation of particles builds up in the chamber. This accumulation serves as a seal for furnace combustion gases which would pass from the furnace but for the accumulation of particles.

In the pre-heating chamber, the particles are caught or lodged in the serrations of the drum feeder and are transported by rotation of the feeder until they are dislodged from the serrations by the force of gravity. Such "flood-feeding" of particles does not deplete the accumulation of the particles in the pre-heat chamber and the gas seal for furnace combustion gases thereby remains intact.

As the particles are dislodged from the serrations of the drum feeder, they pass through the exit port in the form of a planar curtain which is engaged by the guide chute. Where the guide chute is fitted with baffles as described above, horizontal velocity components of the particles are minimizzed and the curtain of particles emanating from the chute and passing through the furnace chamber possesses a greatly reduced tendency to disintegrate and impinge upon the furnace walls.

The curtain of particles is collected at the bottom of the furnace chamber, transversely across a moving planar horizontal collecting surface. As the particles build up on the collecting surface, a slab of foamed ceramic material having a rounded pseudo rectangular cross-sectional area is formed. Various process parameters such as temperature of the furnace chamber and collecting zone, types of foamable composition, and annealing temperatures are set forth in U. S. Pat. No. 3,056,184, to Blaha, incorporated herein by reference. Subsequently, the slab is annealed and machined to the desired rectangular form.

Alternately, the curtain of particles passing through the furnace chamber can be cooled before collection to form a plurality of individual particles called aggregate. Process parameters for forming aggregate by cooling of the particles are described in U. S. Pat. No. 2,676,892, to McLaughlin et al.

With reference to the drawing, the tower furnace (indicated by reference numeral 10) comprises a housing 11 defining an elongated vertical furnace chamber 12. A plurality of inwardly-directed gas burners 13 are mounted in housing 11. Burners 13 are mounted symmetrically about the elongated vertical axis of the furnace chamber 12 so that the flow of gases produced is balanced and has a reduced tendency to disperse particles as they fall through the furnace chamber 12. A supply hopper 14 for particulated material is mounted above the furnace chamber 12.

Positioned between the furnace chamber 12 and the supply hopper 14 is a device for feeding particles into the chamber. The device comprises a casing 20 which defines a pre-heating chamber 17. Mounted horizontally and rotatably within the chamber is an elongated serrated drum feeder 24. The drum feeder 24 is mounted rotatably to casing 20 by means of hollow shaft 23. Casing 20 is fitted with an entry port 26 positioned above the drum feeder 24. Entry port 26 communicates through conduit 25 with particles 22 housed in hopper 14. Positioned below the feeder is an exit port 28. The exit port 28 is positioned in the path of the curtain of particles 21 emanating from drum feeder 24.

Figure 2:
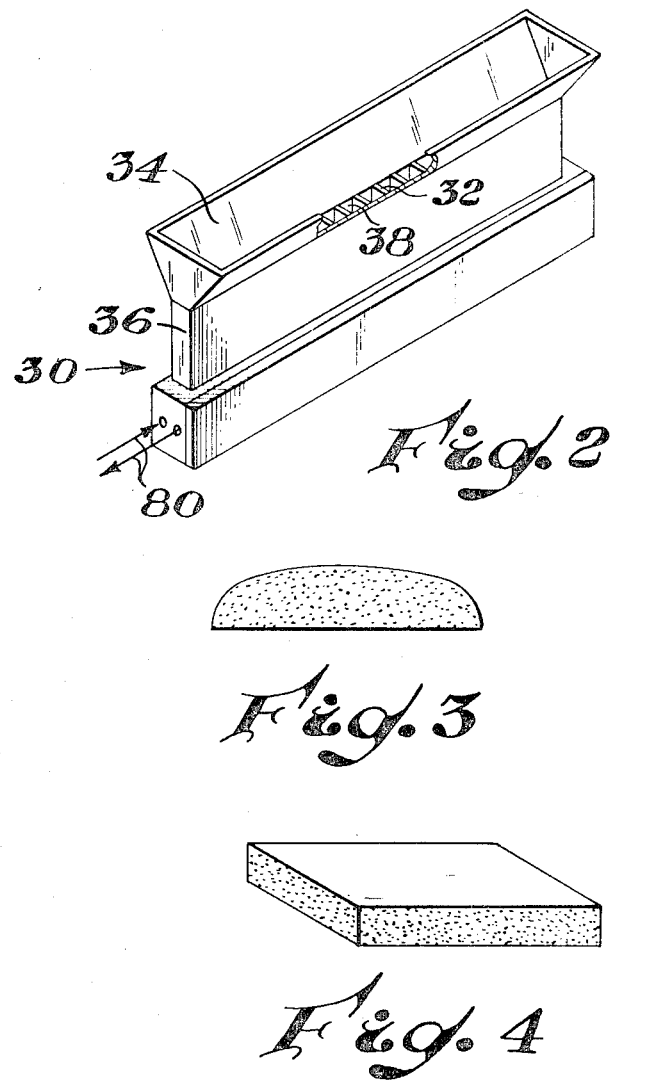
FIG. 2 is a perspective view (partly in section) of the guide chute indicated by reference numeral 30 in FIG. 1.

Positioned below the exit port 28 and immediately adjacent thereto is a guide chute 30. With reference to FIG. 2, the guide chute is fitted with a plurality of baffles 32 which extend generally at right angles to the curtain of particles 21 passing through the chute. The upper walls 34 of chute 30 diverge to form a funnel-like receptacle positioned below exit port 28 of pre-heating chamber 17 and adapted to engage the planar curtain of particles 21 and direct the curtain through the lower portions of the guide chute 30. The lower portions 36 of the chute 30 form, in combination with baffles 32, a plurality of closed and aligned slot-like passages 38. The curtain of particles 21 passes through the slot-like passages 38 and thence through the furnace chamber 12. The lower portions 36 of the chute 30 are cooled by conduits 80 through which air or other cooling fluids are passed.

As can be seen from the drawing, a feature of the invention is the supply of particles to the drum feeder 24. This can be accomplished by use of a hopper 14 which communicates with the feeder 24 as shown in FIG. 1. However, it should be understood that the hopper or other supply of particles could be positioned remote from the furnace chamber 12 so long as a conduit or other suitable means of particle supply extends into operative communication with the drum feeder 24. Such means could include, for example, a fluidized bed feeder or a forced air device for feeding particles to the feeder 24.

In the embodiment of the invention depicted in FIG. 1, the drum 24 is rotatably mounted on hollow shaft 23. The shaft 23 communicates with a source (not shown) of heat transfer medium such as air or water. In this manner, the shaft 23 may transport heat transfer fluids into heat exchange relationship with the feeder 24, thereby to cool the feeder or heat pellets lodged in the serration (i.e., grooves) of the drum feeder. The drum 24 is also fitted with a variable speed chain drive or other driving means (not shown) to impart rotary motion to the drum. A particularly desirable method for cooling drum 24 (and pre-heating pellets entrained thereon) consists of passing fluids previously heated by passage through the lower portions of the guide chute 30 through a conduit (not shhown) into communication with conduit 23a defined by hollow shaft 23. After passing through conduit 23a, the fluids (e.g., air) are allowed to exit from the furnace into the atmosphere, or are otherwise suitably disposed of.

An optional embodiment of the invention is a funnel-like deflector means 50 mounted in the lower portion of furnace chamber 12. The deflector means 50 functions to direct diverging particles back into curtain 21. Generally, the members 50a are constructed from firebrick or a similar heat resistant material. Each member 50a has a downwardly-sloping and inwardly directed deflecting surface 52 exposed to particles deviating from the curtain 21. Side 52 terminates in a lower end 54 which forms an acute angle with the vertical curtain of particles 21. The upper end of side 52 forms an obtuse angle with the wall 11a of the furnace chamber 12. The deflector member 50a is positioned adjacent to the wall 11a of the furnace chamber 12 and is spaced from the center of the furnace chamber and the curtain of particles 21 passing therethrough. Preferably, each deflector member 50a is fitted with pipes 56 or other conduits adapted to transport cooling fluids (e.g., water) through the portion of the member adjacent to deflecting surface 52, thereby to cool the surface. Each pipe communicates with a source of cooling fluid (not shown). Where the particles being heated consist mainly of clay, it is desirable to maintain the deflector members 50a at a temperature of about 1,600°F. or less, to avoid adherence of particles thereto.

Deflector means 50 as described above can be employed along one or more sides of the furnace chamber, or can completely surround the curtain of particles. Frequently, the lower edge 54 of the deflector surface 52 tends to parallel the wall of the furnace chamber 12. For example, where the chamber is cylindrical with a circular cross-sectional area, the deflector member could form an annular, downwardly-converging surface 52 completely surrounding the curtain of particles 12.

Situated at the lower end of the furnace chamber 12 is a collection zone 60 containing a generally planar collecting surface 62 for collecting the curtain of particles 21. The collecting surface is formed by an apparatus (indicated generally by reference numeral 64) for collecting the curtain of particles. Suitable collection apparatus includes, for example, a horizontally disposed conveyor belt. The collecting surface 62 formed by the upper surface of the conveyor belt (or other collection apparatus) is adapted to move so that the curtain falls transversely across the horizontal surface and at right angles to the direction of motion thereof.

In operation of the improved furnace described above, particles of a bloatable composition are passed from a supply of particles such as supply hopper 14 onto the top of serrated drum feeder 24. The particles lodge in the grooves or serrations of the drum. As the drum rotates, the particles are dislodged from the grooves by the force of gravity and pass downwardly through the guide chute 30 and thence through furnace chamber 12 in the form of a generally uniform planar curtain of particles 21.

Particles not dislodged are crushed and thereby removed from the drum by grooved cleaner wheel 19. The curtain of particles 21 falls on movable collecting surface 62 to form a continuous horizontal layer of foamed ceramic material 70 having a width less than the width of the horizontal collecting surface 62.

Figure 3:
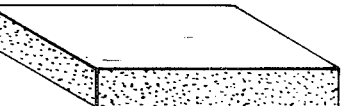
FIG. 3 is a cross-sectional view of a slab of ceramic foam produced by the present invention.

The rectangular cross-sectional surface area of the slab of ceramic material is depicted in FIG. 3. From the nature of the process, it can readily be seen that the serrated drum feeder 24, guide chute 30 and curtain of particles 21 emanating therefrom will have about the same width, while the width of the collecting surface 62 exceeds that of either the curtain 21, feeder 24, or chute 30.

Figure 4:
FIG. 4 is a slab as in FIG. 3 which has been machined.

Once formed, the slab of ceramic material is passed through a controlled temperature zone 72 heated by burners 74 and by the combustion gases from furnace chamber 12. As the surface of the slab 70 cools in zone 72, the slab surface becomes rigid and can be passed onto rollers 76 without deforming, i.e., "drooping." Subsequently, the slab is further annealed in a conventional annealer (not shown). At any time after passage onto rollers 76, the slab can be machined by ordinary masonry cutting tools to resemble the slab of FIG. 4.

In the process as described above, a particular advantage of the serrated drum feeder 24 is that particles lodged in the grooves of the drum are preheated, thereby reducing the amount of heat which must be obtained by the particles in passing through furnace chamber 12. The moisture content of the particles is also reduced. A further advantage arises in that hollow shaft 23 and conduit 23a combine to transport water, air or other fluids into heat exchange relationship with the drum feeder 16, thereby cooling the drum 24 and prolonging the useful life thereof. In addition, by controlling fluid temperature, and the rate of circulation of fluids through the drum, the temperature of the drum and of particles situated thereon are also controlled.

What is claimed is:

1. In a tower furnace defining an elongated vertical furnace chamber, a supply hopper for particulate material mounted above the furnace chamber, and a particle feeding device positioned between the hopper and the furnace chamber, the improved feeding device comprising:

a casing defining a pre-heating chamber; an elongated generally horizontally-disposed serrated drum feeder mounted rotatably within said chamber, said drum adapted to receive particles from the hopper onto the drum surface where they lodge in the serrations of the drum to be dislodged in the form of a generally planar curtain of particles as the drum rotates; said casing fitted with a particle entry port and a particle exit port, said entry port positioned above the drum in communication with the particle supply hopper, said exit port positioned beneath the drum in the path of the curtain of particles emanating therefrom; and a guide chute positioned below the exit port and immediately adjacent thereto, said guide chute being fitted with a plurality of spaced-apart baffles disposed at generally right angles to the planar curtain of particles passing through the chute and said chute adapted to engage and direct the curtain of particles passing from the pre-heat chamber through the furnace chamber.

2. An improved furnace as in claim 1 wherein the drum feeder is rotatably mounted upon a hollow shaft defining a conduit adapted to transport a supply of cooling fluids into heat exchange relationship with the drum feeder.

3. An apparatus as in claim 1 wherein the distance between the baffles is from about 10 to about 25 times the average major dimension of the individual particles, and the length of channels formed by the baffles is from about 150 to about 250 times the average major dimension of the individual particles.

4. An apparatus as in claim 1 wherein the chute is pivotally mounted.

5. In a tower furnace defining an elongated vertical furnace chamber, a supply hopper for particulate material mounted above the furnace chamber, and a particle feeding device positioned between the hopper and the furnace chamber, the improved feeding device comprising:

a casing defining a pre-heating chamber; an elongated generally horizontally-disposed serrated drum feeder mounted rotatably within said chamber, said drum adapted to receive particles from the hopper onto the drum surface where they lodge in the serrations of the drum to be dislodged in the form of a generally planar curtain of particles as the drum rotates; said casing fitted with a particle entry port and a particle exit port, said entry port positioned above the drum in communication with the particle supply hopper, said exit port positioned beneath the drum in the path of the curtain of particles emanating therefrom; a guide chute positioned below the exit port and immediately adjacent thereto, said chute adapted to engage and direct the curtain of particles passing from the pre-heat chamber through the furnace chamber and downwardly subtending particle deflector means mounted in the lower portion of the furnace chamber remote from the curtain of particles, said deflector means having a planar particle-deflecting surface terminating in a lower edge forming an acute angle with the curtain of particles, and originating in an upper edge positioned adjacent to the wall of the furnace chamber, said deflector means fitted with conduits for conveying cooling fluids through the deflector.

6. An apparatus as in claim 5 wherein the guide chute is fitted with a plurality of spaced-apart baffles disposed at generally right angles to the planar curtain of particles passing through the chute.

* * * * *